(12) United States Patent
Gayles et al.

(10) Patent No.: US 12,141,252 B1
(45) Date of Patent: *Nov. 12, 2024

(54) ASSIGNING NEW PASSCODES TO ELECTRONIC DEVICES

(71) Applicant: Amazon Technologies, Inc., Seattle, WA (US)

(72) Inventors: Edward James Gayles, Tracy, CA (US); Lawrence Arnold Lynch-Freshner, Boulder Creek, CA (US); Sailesh Rachabathuni, Santa Clara, CA (US); David Berbessou, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,031

(22) Filed: Sep. 8, 2023

Related U.S. Application Data

(63) Continuation of application No. 17/359,796, filed on Jun. 28, 2021, now Pat. No. 11,790,059, which is a continuation of application No. 15/869,144, filed on Jan. 12, 2018, now Pat. No. 11,048,781, which is a continuation of application No. 12/715,832, filed on Mar. 2, 2010, now Pat. No. 9,870,452.

(51) Int. Cl.
*G06F 21/31* (2013.01)
*G06F 21/36* (2013.01)

(52) U.S. Cl.
CPC .............. *G06F 21/31* (2013.01); *G06F 21/36* (2013.01); *G06F 2221/2131* (2013.01)

(58) Field of Classification Search
CPC .................................. G06F 21/31; G06F 21/36

USPC ............. 713/182–184; 726/2, 5, 6, 7, 18, 19
See application file for complete search history.

(56) References Cited

U.S. PATENT DOCUMENTS

| | | | |
|---|---|---|---|
| 5,060,263 A | 10/1991 | Bosen et al. | |
| 7,644,860 B2 * | 1/2010 | Matsushita | G06F 21/31 235/380 |
| 7,673,046 B2 * | 3/2010 | Lehew | H04L 63/061 709/225 |

(Continued)

FOREIGN PATENT DOCUMENTS

EP 2105857 A2 9/2009

OTHER PUBLICATIONS

Office Action for U.S. Appl. No. 15/869,144, mailed on Feb. 14, 2020, Gayles, "Assigning New Passcodes to Electronic Devices", 16 Pages.

(Continued)

*Primary Examiner* — Mohammed Waliullah
(74) *Attorney, Agent, or Firm* — Lee & Hayes, P.C.

(57) ABSTRACT

An electronic book distribution system includes electronic devices that reset their passcodes after specified authentication failures. The passcodes of an individual electronic device is reset to a value that is generated using a predefined function of a randomly generated support code. The support code is displayed to the user, and the user is instructed to contact a support service in order to obtain the new passcode. The support service independently authenticates the user, calculates the new device passcode using the same predefined function used by the electronic device, and provides the new passcode to the user.

20 Claims, 4 Drawing Sheets

(56) References Cited

U.S. PATENT DOCUMENTS

| | | | |
|---|---|---|---|
| 8,505,082 | B2 | 8/2013 | Hiraike |
| 9,870,452 | B1 | 1/2018 | Gayles et al. |
| 2001/0017712 | A1 | 8/2001 | Kasatani |
| 2001/0037388 | A1* | 11/2001 | Suzuki ................. H04M 1/67 709/225 |
| 2002/0049915 | A1* | 4/2002 | Yasushi ............... H04L 63/083 726/28 |
| 2003/0149866 | A1 | 8/2003 | Neuman et al. |
| 2003/0208683 | A1* | 11/2003 | Johnson ................ G06F 21/31 713/183 |
| 2004/0103287 | A1 | 5/2004 | Newby et al. |
| 2005/0015604 | A1* | 1/2005 | Sundararajan ......... G06F 21/36 713/184 |
| 2005/0188193 | A1* | 8/2005 | Kuehnel ............... G06F 21/445 713/155 |
| 2006/0059361 | A1 | 3/2006 | Paden et al. |
| 2006/0069654 | A1 | 3/2006 | Beach et al. |
| 2006/0085845 | A1* | 4/2006 | Davis .................... G06F 21/31 726/6 |
| 2006/0107316 | A1* | 5/2006 | Fiske .................... G06F 21/32 726/18 |
| 2006/0230283 | A1* | 10/2006 | McBride ................ G06F 21/31 713/184 |
| 2007/0239988 | A1 | 10/2007 | Atzmony et al. |
| 2007/0250704 | A1 | 10/2007 | Hallam-Baker |
| 2008/0016347 | A1 | 1/2008 | Maj et al. |
| 2008/0077984 | A1* | 3/2008 | Kim ..................... H04L 63/083 726/18 |
| 2008/0115199 | A1 | 5/2008 | Young et al. |
| 2008/0170690 | A1* | 7/2008 | Tysowski ............ H04L 67/1095 709/218 |
| 2008/0181406 | A1 | 7/2008 | Iyer et al. |
| 2008/0320555 | A1* | 12/2008 | Ciaffi ................... G06F 21/34 726/2 |
| 2009/0083739 | A1* | 3/2009 | Lynch .................. H04L 63/10 718/101 |
| 2009/0150991 | A1 | 6/2009 | Hoey et al. |
| 2009/0172443 | A1 | 7/2009 | Rothman et al. |
| 2009/0240620 | A1* | 9/2009 | Kendrick .............. G06Q 20/40 705/39 |
| 2009/0300168 | A1* | 12/2009 | Guo ..................... G06F 21/73 709/224 |
| 2010/0011418 | A1* | 1/2010 | Despain ............. G07C 9/00023 726/4 |
| 2011/0082767 | A1* | 4/2011 | Ryu ..................... H04L 63/0838 726/28 |
| 2011/0230161 | A1* | 9/2011 | Newman ........... H04M 1/72541 455/404.1 |
| 2012/0054842 | A1* | 3/2012 | Urios Rodriguez ... G06Q 20/40 726/6 |

OTHER PUBLICATIONS

Final Office Action for U.S. Appl. No. 12/715,832, mailed on Feb. 27, 2015, Edward J. Gayles, "Assigning New Passcodes to Electronic Devices", 15 pages.

Office ACtion for U.S. Appl. No. 17/359,796, mailed on Mar. 15, 2023, Inventor #1 Edward James Gayles, "Assigning New Passcodes to Electronic Devices," 15 pages.

Office Action for U.S. Appl. No. 15/869,144, mailed on Jun. 19, 2020, Gayles, "Assigning New Passcodes to Electronic Devices", 18 Pages.

Office Action for U.S. Appl. No. 15/869,144, mailed on Sep. 25, 2020, Gayles, "Assigning New Passcodes to Electronic Devices", 19 Pages.

Office action for U.S. Appl. No. 12/715,832, mailed on Jan. 19, 2017, Gayles et al., "Assigning New Passcodes to Electronic Devices", 12 pages.

Final Office Action dated Oct. 18, 2019 for U.S. Appl. No. 15/869,144 "Assigning New Passcodes to Electronic Devices" Gayles, 15 pages.

Office Action for U.S. Appl. No. 17/359,796, mailed on Oct. 26, 2022, Edward James Gayles, "Assigning New Passcodes to Electronic Devices", 14 pages.

Office action for U.S. Appl. No. 12/715,832, mailed on Feb. 25, 2013, Gayles et al., "Assigning New Passcodes to Electronic Devices", 8 pages.

Office action for U.S. Appl. No. 12/715,832, mailed on Mar. 28, 2016, Gayles et al., "Assigning New Passcodes to Electronic Devices", 13 pages.

Office Action for U.S. Appl. No. 15/869,144, mailed on Jun. 6, 2019, Gayles, "Assigning New Passcodes to Electronic Devices", 14 pages.

Office action for U.S. Appl. No. 12/715,832, mailed on Jul. 17, 2014, Gayles et al., "Assigning New Passcodes to Electronic Devices", 16 pages.

Office Action for U.S. Appl. No. 12/715,832, mailed on Aug. 28, 2015, Gayles et al., "Assigning New Passcodes to Electronic Devices", 15 pages.

Office action for U.S. Appl. No. 12/715,832, mailed on Sep. 14, 2012, Gayles et al., "Assigning New Passcodes to Electronic Devices", 6 pages.

\* cited by examiner

ASSIGNING NEW PASSCODES TO ELECTRONIC DEVICES

CROSS REFERENCE TO RELATED APPLICATIONS

This application claims priority to and is a continuation of U.S. patent application Ser. No. 17/359,796, filed on Jun. 28, 2021, which claims priority to and is a continuation of U.S. patent application Ser. No. 15/869,144, filed on Jan. 12, 2018, now known as U.S. Pat. No. 11,048,781, which issued on Jun. 29, 2021, which claims priority to and is a continuation of U.S. patent application Ser. No. 12/715,832 filed Mar. 2, 2010, now U.S. Pat. No. 9,870,452, which issued on Jan. 16, 2018, entitled "Assigning New Passcodes to Electronic Devices," all of which are incorporated herein by reference in their entirety.

BACKGROUND

Securing mobile devices against unauthorized access has become more important as these devices become more widely used and as they are increasingly being used to store sensitive data. Devices such as mobile phones, laptops, tablet computers, music and video players, and electronic book (eBook) reader devices now routinely contain personal data, and often contain confidential business information. In addition, these devices often contain further security-related information, such as cached logins and passcodes, that can allow others to access to even more personal or confidential data.

If a user is concerned about the consequences of a mobile device falling into the wrong hands, the device can often be configured to require a passcode to be entered prior to device operation. However, passcodes have notorious weaknesses, especially when selected or used carelessly.

One of the biggest problems with relying on passcode protection is that users often select passcodes based on some easily obtainable personal data. For example, users often select a passcode that is derived from their birth date or some other date that is significant to them. This makes it relatively easy for someone else to eventually find the right passcode through trial and error.

In order to make it more difficult for someone to guess a passcode, many devices limit the number of attempts that can be made to authenticate with a mobile device. For example, a device might allow ten attempts to provide a correct passcode, and after entry of the tenth invalid passcode might permanently lock the device or erase all of its contents.

This type of scheme is effective, but sometimes creates problems for a legitimate user who has simply forgotten his or her passcode. Erasing or resetting a device in this situation might create a huge inconvenience, and in some cases might cause the irretrievable loss of important data.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
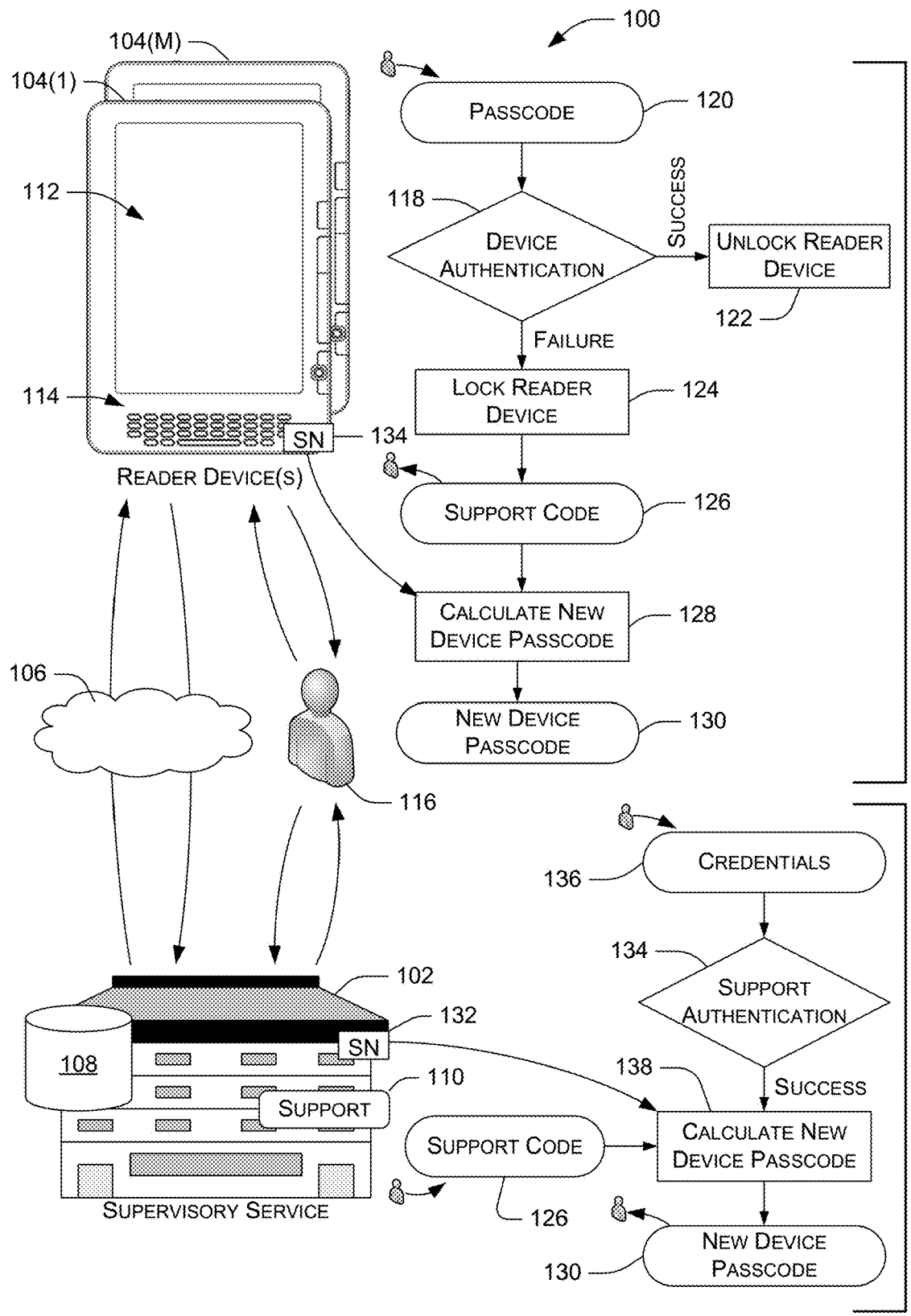
FIG. 1 is a schematic diagram of an illustrative environment and associated illustrative processes for authenticating a user of a mobile computing device.

This disclosure describes an architecture and techniques in which a rendering device may reset a passcode associated with the device after a specified number of authentication failures. Within the architecture described below, electronic content or media items are distributed to rendering devices for consumption by human users of the rendering devices. The media items may be any type or format of digital content, including, for example, electronic texts (e.g., eBooks, electronic magazines, digital newspapers, etc.); digital audio (e.g., music, audible books, etc.); digital video (e.g., movies, television, short clips, etc.); images (e.g., art, photographs, etc.); applications or programs; interactive or "rich" book content containing graphics, animations, video, and/or audio; and multi-media content. In the illustrated environment, an electronic book reader device is provided to consume digital media items, such as electronic books, magazines, audio books, and so forth.

The content rendering devices may be embodied in many ways, such as electronic book readers, cellular telephones, personal digital assistants (PDAs), portable media players, tablet computers, netbooks, and the like. However, in specific implementations described below, the rendering device is a dedicated handheld electronic book (eBook) reader device ("eBook reader device"). A device such as this is typically configured for the specific task of rendering electronic books, and is not generally alterable by the user to perform tasks not anticipated by the manufacturer of the device.

Although designed and optimized for the specific task of reading textual content, an eBook reader device can also contain data provided by a user. For example, an eBook reader device contains notes and annotations made in conjunction with reading one or more eBooks. Furthermore, the eBook reader might contain cached information allowing an unauthorized user to login to web-based services in order to purchase eBooks and other materials using an account of the original owner of the eBook reader.

In order to prevent unauthorized use, an eBook reader device can be configured to request entry of a passcode before activating the normal user interface of the device. To decrease the likelihood of someone guessing the passcode, the device can limit the number of consecutive passcode entry failures that are allowed. In the embodiments described below, however, rather than resetting or erasing itself after a specified number of authentication failures, the device resets its passcode. The new passcode is generated within the eBook reader device as a function of a random number also generated within the eBook reader device. Because the new passcode is generated arbitrarily, it no longer has any meaning or relationship to the original user, and there is much less chance that a fraudulent or unauthorized user will be able to guess the new passcode.

The random number is referred to herein as a support code, and is displayed to the user of the eBook reader device when the device passcode is reset. A legitimate user can then call a support technician and report the support code. The support technician uses the support code to calculate the new passcode, using the same function that was used on the device itself, and informs the user of the new passcode. The legitimate user can then enter the passcode into the device and use the device as normal.

In order to ensure that a calling user is legitimately authorized to use the device and receive the new passcode, the support technician can ask the calling user to authenticate himself or herself by supplying information other than the original passcode, such as account information associated with the user or device. A fraudulent user will not be able to provide this information, and thus will not receive the new passcode from the support technician.

Note that instead of calling a human-based support service, the user may be able to login to a web-based service using appropriate credentials, enter the support code at the web-based service, and receive the new passcode from the web-based service.

Embodiments utilizing these concepts will be described below.

FIG. 1 is a schematic diagram of an illustrative environment 100 that includes various computing devices for distributing and consuming electronic works such as digital or electronic books. In particular, FIG. 1 illustrates an electronic book distribution environment or system including a supervisory service 102 and a plurality of dedicated electronic book (eBook) reader devices 104(1), ..., 104(M) in communication over a network 106. In addition to distributing eBooks, the system of FIG. 1 facilitates and protects access to the eBook reader devices 104(1)-(M).

Supervisory service 102 provides eBooks to rendering devices such as example eBook reader device 104(1). In the example described herein, the electronic content includes electronic books and other textual publications that are distributed in digital form rather than on physical media. Electronic content might also comprise audio or graphical elements, either alternatively or in addition to textual content. Moreover, the term "eBook", as used herein, includes electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the term "eBook" may include any readable or viewable content that is in electronic or digital form.

The supervisory service 102 receives requests from the reader device 104(1) and responds to such requests by delivering media items from content storage 108 through the network 106. Alternatively, the supervisory service 102 might push media items and other data to the device 104(1) without receiving requests. That is, communications may essentially be one way from the supervisory service 102 to the reader device 104(1).

In the described implementation, the supervisory service 102 also supervises subscribing eBook reader devices; facilitating book selection, ordering, delivery, payment, and so forth. Furthermore, the supervisory service 102 implements a support service 110 for users of eBook reader devices, which the users may contact when they have problems or issues with their devices. The support service 110 may be web-based, telephone/voice-based, kiosk-based, or the like. The support service 110 may also communicate with users via email, short messaging service (SMS) text messages, multimedia messaging service (MMS) text messages, or in any other manner.

Note that although the supervisory service 102 is illustrated as a discrete entity, it may in fact comprise multiple entities, components, functions, websites, etc.

The eBook reader device 104(1) in this embodiment is a dedicated handheld device equipped with a passive display 112 to display eBooks with minimal power requirements. The eBook reader device 104(1) has various keys and buttons that form a character input interface 114 to facilitate navigation of electronic content and to allow entry of data including login and/or passcode information. Distributed eBooks are rendered upon the display 112 of the eBook reader device 104(1). In addition, the character input interface 114 may include touch-screen functionality to receive input via the display 112, may include a microphone to receive audible input from a user, or may include any other functionality that facilitates user input (e.g., of login and/or passcode information).

The network 106 over which the supervisory service 102 and the eBook reader device 104(1) communicate in one embodiment may be implemented as one or more network(s) suitable to serve or provide electronic content and services to various consuming devices such as the eBook reader device 104(1). Communications between the supervisory service 102 and the eBook reader device 104(1) may utilize wired networks (e.g., cable) and or wireless networks (e.g., cellular, WiFi, satellite, etc.). In addition or as an alternative, the content may be transferred between the supervisory service 102 and the eBook reader device 104(1) via removable storage media such as secure digital (SD) memory cards, portable hard disks, and other portable storage media and/or devices. As yet another alternative, the eBook reader device 104(1) may be connected to another device that facilitates communication with the supervisory service 102. For example, a personal computer (not shown) might communicate over the network 106 with the supervisory service 102, and relay desired information to and from the eBook reader device 104(1) via a communication medium such as USB or Bluetooth.

FIG. 1 shows a user 116 who interacts with both the supervisory service 102 and the eBook reader device 104(1). Operations and interactions with the user 116 are illustrated by flowcharts. The actions and interactions to the right of the supervisory service 102 are performed by the supervisory service 102 while the actions and interactions to the right of the eBook reader device 104(1) are performed by the eBook reader device 104(1).

The eBook reader device 104(1) in this example is configured to lock itself after a period of inactivity such as when no user input is detected. When locked, the user interface of the device is disabled, preventing normal operation. The eBook reader device 104(1) might also enter a low power state or "sleep" during this period to conserve battery resources. The eBook reader device may also be manually turned off or inactivated by the user 116, which similarly causes the device to enter the locked or sleep state.

The user 116 may "wake" the eBook reader device 104(1) by pressing any of buttons or by other actions depending on the hardware capabilities and configuration of the eBook reader device 104(1). When it senses user input, the eBook reader device 104(1) restores power and prompts the user 116 for a passcode that has been previously configured by the user 116. Upon entry of the correct passcode, the device unlocks itself, meaning that the user interface is enabled and that the full functionality of the device is restored.

This process of user authentication at the reader device 104(1) is represented in FIG. 1 as action 118. Generally, it involves authenticating the user in response to entry by the user of a device passcode. More specifically, the authentication 118 in this example comprises prompting the user 116 for a passcode 120, receiving the entered passcode 120 from the user 116, and determining whether the received passcode 120 matches a device passcode that the user 116 has previously configured. In response to successful authenticating (i.e., entry of the correct passcode), the eBook reader device 104(1) unlocks itself and enables its full device functionality at 122.

Unsuccessful authenticating, or authentication failure, can be defined in different ways. In one embodiment, failure is defined as receiving multiple sequential entered passcodes 120 that do not match the previously configured device passcode. For example, authentication failure might be defined as receiving ten consecutive incorrect passcodes 120 from the user 116. In practice, this means that the user 116 has ten chances to enter the correct passcode. If the correct passcode is not received by the eBook reader device 104(1) within those ten attempts, the device declares that authentication has not been successful.

In response to unsuccessful authentication, the eBook reader device 104(1) performs an action 124 of locking itself, which in most situations means that the user interface and the fully functionality of the device will continue to be disabled.

Also in response to an unsuccessful authentication, the eBook reader device 104(1) performs an action of obtaining and displaying a support code 126 to the user 116 using the display 112 of the eBook reader device 104(1). The support code 126 is a randomly generated code comprising a limited number of characters that can be also used as the input to a passcode generation function. It is displayed to the user 116 along with a message instructing the user 116 to contact the support service 110 and to provide the support code 126 to the support service 110.

In further response to an unsuccessful authentication, the eBook reader device 104(1) performs an action 128 of calculating a new device passcode 130, based at least in part on the support code 126. The new device passcode 130 is calculated using a predefined function that is based on the support code 126 that was previously displayed to the user. In addition, this function may be based on a device ID of the eBook reader device 104(1). The device ID may comprise a serial number 132 of the device, a modem identifier of the device, or any other unique identifier associated with the eBook reader device 104(1).

In some instances, the passcode that is calculated based on the support code may only be valid for a predetermined amount of time. As such, the user of the eBook reader device 104(1) may need to contact the support service with the support code within the predetermined amount of time in order to successfully unlock the device with the new passcode. The predetermined amount of time may be a number of minutes, hours, days, weeks or the like. In some instances, meanwhile, the newly calculated passcode may be valid for an indefinite amount of time.

In order to obtain this new passcode, the user 116 contacts the support service 110. The support service 110 performs an authentication 134 in order to verify the identity of the user 116. The authentication 134 in the described example is performed independently of the eBook reader device 104(1), based on identifying information other than the original device passcode.

For example, the authentication might be performed by the user 116 calling or otherwise contacting the support service 110, which might be voice-based, telephone-based, web-based, kiosk-based and/or the like. In this embodiment, the actions shown as being performed by the support service 110, such as authenticating the user receiving the support code, and calculating the new device passcode are performed independently of the eBook reader device 104(1), although other embodiments might use features of the eBook reader device 104(1) to communicate with the support service 110 and to thereby obtain the new device passcode.

In the described example, the authentication 134 might be performed by the support service 110 asking that the user 116 supply credentials 136 such as passcodes, confidential information, account information, personal information, or other information or data that can be verified against account records. Generally, as mentioned above, the authentication 134 involves credentials or authenticating information other than the passcode used to unlock eBook reader device 104(1). This provides an authentication of the user 116 that is independent of the eBook reader device 104(1), and does not rely on security features of the eBook reader device.

Upon successful authentication of the user 116, the support service 110 requests and receives the support code 126 from the user 116. At 138, the support service 110 calculates the new device passcode 130 using the same function as the eBook reader device 104(1) used to calculate the new device passcode in action 128. As mentioned, this passcode generation function receives the support code 126 as an input parameter, and optionally accepts the device ID or serial number 132 as another input parameter. The serial number 132 is typically associated with the user account of the user 116. It can be part of the account information maintained by the supervisory service 102 and is thus available to support service 110, independently of the eBook reader device 104(1). Thus, in some embodiments the support service 110 accesses a stored reader device ID 132 and uses it as an input parameter to the predetermined function used to calculate the new device passcode. Because the predetermined function and its input parameters are the same as used by the eBook reader device 104(1), the resulting device passcode will also be the same, and will therefore allow the user 116 to unlock the eBook reader device 104(1).

The support service 110 then communicates the new device passcode to the user 116, along with information instructing the user 116 to use the new device passcode to unlock the eBook reader device 104(1).

Figure 2:
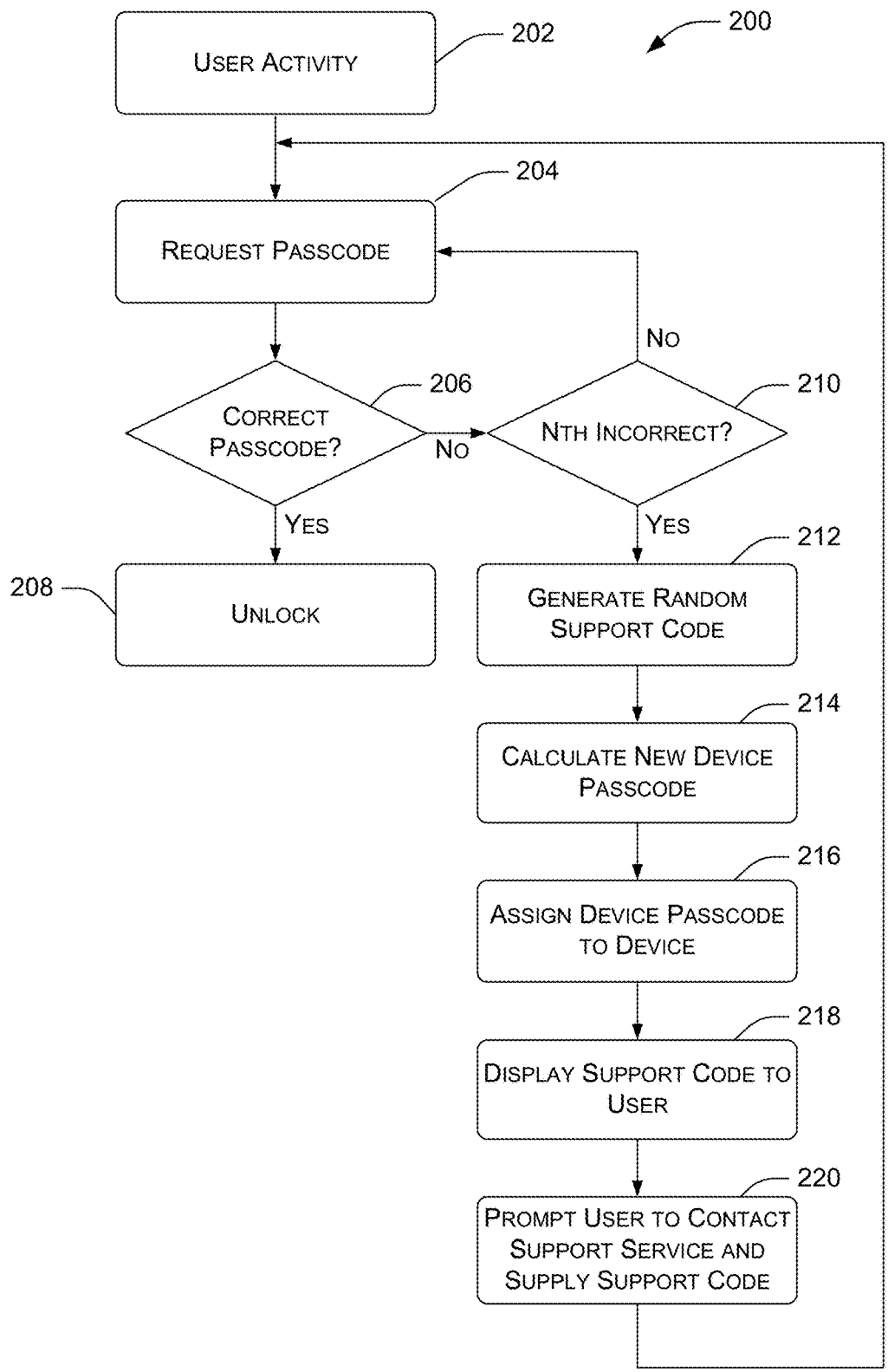
FIG. 2 is a flow diagram of an illustrative process performed in connection with authenticating a user of a mobile computing device.

FIG. 2 shows a more detailed illustrative process 200 of protecting access to the eBook reader device 104(1). This example assumes that the eBook reader device 104(1) has entered a locked state, in response to a user command or in response to a detected period of inactivity. The illustrative process 200 is initiated in response to the detection of some user activity 202, such as by pressing a button, moving the device, or activating a power switch.

At 204, the eBook reader device 104(1) prompts the user 116 to enter a passcode in order to unlock the device. In the described embodiment, this is accomplished by displaying a message on the display 112 of the eBook reader device 104(1). The user 116 enters a passcode using the keys or using whatever other input mechanism might be employed by the eBook reader device 104(1).

At 206, the eBook reader device 104(1) determines whether the entered passcode is correct: that is, whether the entered passcode matches a device passcode previously configured by the user or otherwise associated with the device. Note that the device passcode may not be stored on the eBook reader device 104(1). Instead, a hash or encrypted form of the device passcode may be stored on the eBook reader device 104(1). To validate the device passcode in this situation, the eBook reader device 104(1) performs the same hash or encryption on the passcode entered by the user 116, and compares the result to the previously stored hash or encryption of the device passcode.

If the user 116 has entered the valid passcode, the device is unlocked at 208.

If the user 116 has entered an invalid or incorrect passcode, the eBook reader device 104(1) determines at 210 how many consecutive times this has happened. If an incorrect passcode has been received less than a predetermined limit "N", the user is again prompted for the passcode at 204. However, if the number of consecutive invalid passcode entries is as great as the predetermined limit "N", actions are taken to reset the device passcode, starting with action 212. The predetermined limit "N" may be any integer greater than zero. For instance, actions may be taken to reset the device passcode after one entry of an incorrect passcode, ten entries of an incorrect passcode, fifty entries of an incorrect passcode or after any other number of incorrect entries.

At 212, in response to what is generally referred to herein as an authentication failure, the eBook reader device 104(1) generates a support code, which in this example comprising producing a random number. The random number is generated to have a limited length that is convenient to be displayed and subsequently articulated by the user 116 to a support representative of the support service 110.

At 214, the eBook reader device 104(1) calculates a new device passcode using a predetermined function that is based at least in part on the randomly-generated support code of action 212. The predetermined function may comprise a cryptographic hash algorithm or the like.

In addition to being based on the randomly-generated support code, the passcode generation function and its resulting new device passcode can be based on information that is unique to the eBook reader device 104(1) itself, such as the device ID or serial number 132 of the eBook reader device 104(1). Additionally or alternatively, the new device passcode may possibly be based on other information that is a characteristic of the user 116, the reader device 104(1), and/or the user's account.

At 216, the eBook reader device 104(1) assigns the new passcode as the device passcode. In some instances, the new passcode is assigned as an additional passcode, meaning that one or more other previously assigned passcodes are still valid and may still be used to unlock the device. In other instances, meanwhile, the previous device passcode is replaced with the calculated new device passcode, meaning the any previously assigned device passcodes could no longer be used to unlock the device. As already mentioned, either of these options may or may not involve storing the new passcode itself. In the latter instances, this may comprise storing a hash or encrypted version of the new passcode.

At 218, the eBook reader device 104(1) communicates the support code to the user 116, for example by displaying it on display 112. In addition, at 220 the eBook reader device 104(1) prompts and instructs the user 116 to contact and authenticate with the support service 110 and to supply the displayed support code to the support service 110 in order to obtain the new passcode.

Execution then returns to action 204, and the user is given another opportunity to enter a valid device passcode, which will now be the new device passcode. Note that the user 116 is again given ten tries (in this example) to enter the correct passcode, and that ten failures will result in yet another resetting of the device passcode. In other embodiments, subsequent authentication failures may not result in additional resetting, and may instead simply continue to prompt the user after each invalid attempt to contact the support service 110 with the originally generated support code. Upon eventual entry of a valid device passcode, the eBook reader device 104(1) unlocks its functionality at 208.

Illustrative Supervisory Service

Figure 3:
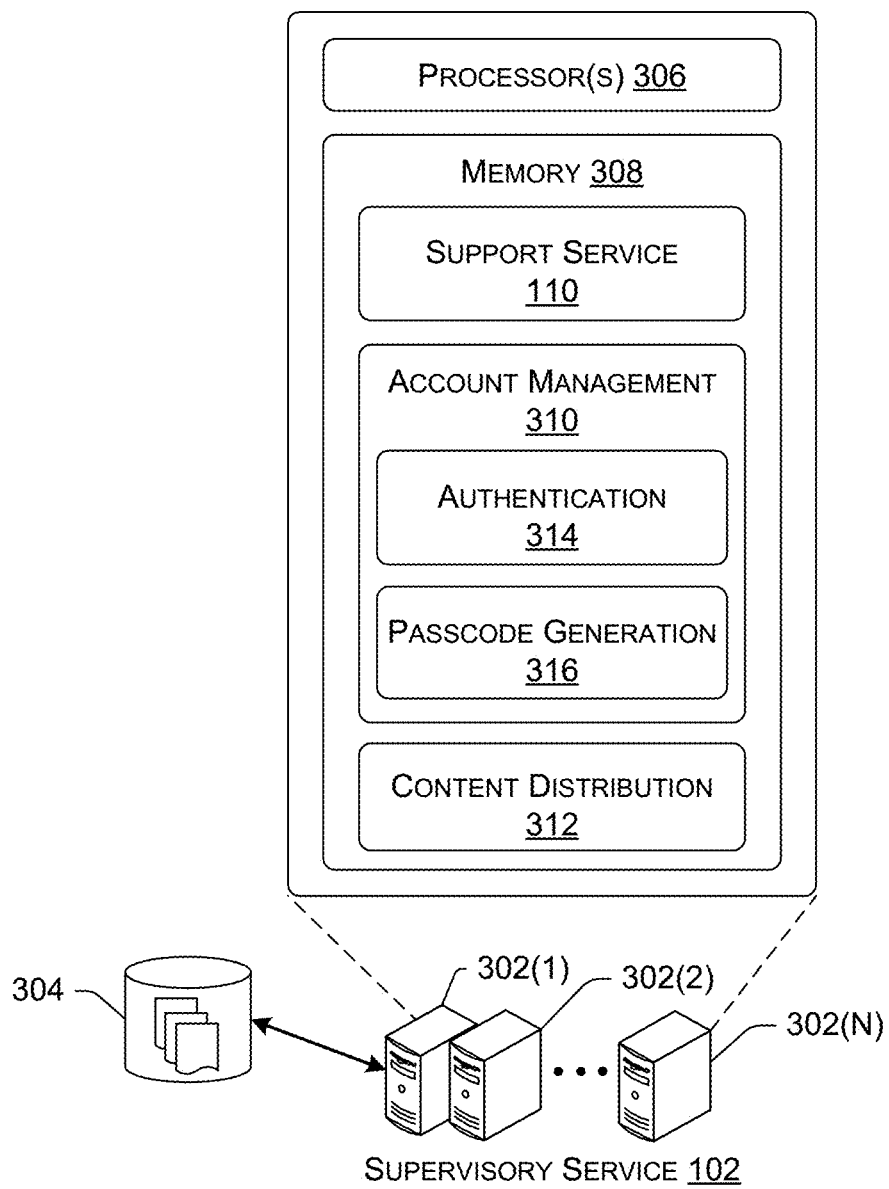
FIG. 3 is a block diagram illustrating relevant components of an electronic book (eBook) distribution and supervision service.

FIG. 3 is a simplified diagram showing relevant logical components of the supervisory service 102. The supervisory service 102 is hosted on one or more servers 302(1), 302(2), . . . , 302(N) and includes associated data storage 304 that serves or provides electronic content and services to consuming devices, such as the eBook reader device 104(1).

The servers 302(1)-(N) collectively have processing and storage capabilities to receive requests from the eBook reader device 104(1) and respond to such requests by delivering the eBook content and services. Alternatively, the servers 302(1)-(N) might push media items and other data to the eBook reader device 104(1) without receiving requests, as discussed above.

In the described implementation, servers 302(1)-(N) also supervise subscribing the eBook reader devices, such as the eBook reader device 104(1), facilitating book selection, ordering, delivery, payment, and so forth.

The servers 302(1)-(N) may be embodied in any number of ways, including as a single server, a cluster of servers, a server farm or data center, and so forth, although other server architectures (e.g., mainframe) may also be used. FIG. 3 illustrates simplified components of the collective servers, including one or more processors 306 and computer-readable memory 308. The memory 308 includes both volatile and non-volatile memory such as used for storing applications, modules, and/or data. The memory 308 stores computer-readable instructions that are executable by the processor 306 to perform the actions and techniques described herein as being performed by the supervisory service 102 or its component servers 302(1)-(N).

Most relevant to this discussion, the memory 308 may include components or functionality including support service 110, account management 310, and content distribution 312.

The support service 110 may be an automated online system that performs the actions already attributed to the support service 110 in the discussion of FIG. 1, such as authenticating a user, accepting support codes, and providing new device passcodes. Alternatively, the support service 110 may be staffed by technicians or operators using voice or other real-time communication capabilities, and who communicate directly with inquiring users.

Account management 310 comprises components that can be utilized by the automated support service 110 or by a human support technician to respond to inquiries requesting new device passcodes. Account management 310 includes an authentication function 314 that facilitates authentication of the user 116 based on information provided by the user as already described.

Account management 310 also includes passcode generation functionality 316 that accepts a support code and a device serial number, and possibly other information, to generate a new device passcode. As already described, this functionality uses the same passcode generation algorithm as used in the eBook reader device 104(1), so that any new device passcodes generated in response to a common support code will be identical, regardless of whether they are generated at the device 104(1) or at the supervisory service 102.

Although functions of the supervisory service 102 are shown as being loosely integrated, these functions may be provided by different sites and even by different online entities. Also note that the illustrated services may not be segregated in the manner shown, and may in fact be implemented as part of a single integrated service. Furthermore, the supervisory service 102 will often implement additional functions, in addition to those shown in FIG. 3.

Illustrative Reader Device

Figure 4:
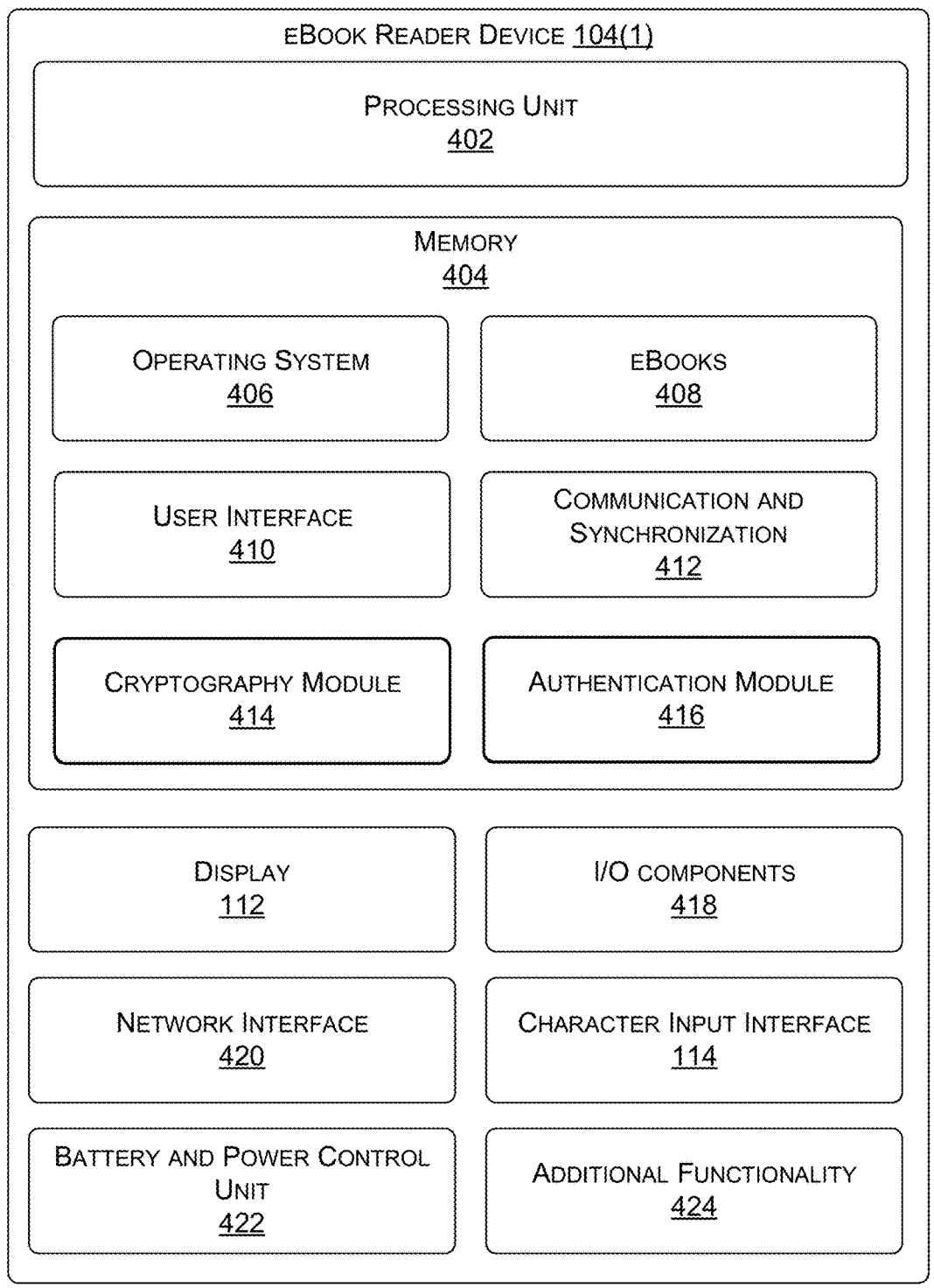
FIG. 4 is a block diagram of relevant components of an illustrative eBook reader device.

FIG. 4 illustrates relevant and illustrative components that might be implemented in the eBook reader device 104(1). In a very basic configuration, the eBook reader device 104(1) includes a processing unit 402 composed one of one or more processors, and memory 404. Depending on the configuration of the eBook reader device 104(1), the memory 404 is an example of computer storage media and may include volatile and nonvolatile memory. Thus, the memory 404 may include, but is not limited to, RAM, ROM, EEPROM, flash memory, or other memory technology, or any other medium which can be used to store media items or applications and data which can be accessed by the eBook reader device 104(1).

The memory 404 may be used to store any number of functional components that are executable on the processing unit 402, as well as data and media items that are rendered by the eBook reader device 104(1). Thus, the memory 404 may store an operating system 406 and an eBook storage database to store one or more media items 408, such as eBooks and audio books.

Generally, the operating system 406 will perform or coordinate the functions and operations described above, including locking the device, prompting for passcodes, resetting passcodes, unlocking the device, etc. These functions may be performed in conjunction with other components or modules, described below, which may or may not be considered part of the operating system 406.

A user interface (UI) module 410 may be provided in the memory 404 and executed on the processing unit 402 to provide for user operation of the device 104(1). The UI module 410 may provide menus and other navigational tools to facilitate selection and rendering of the media items 408, as well as guiding a user through procedures described herein of obtaining new passcodes. The UI module 410 may further include a browser or other application that facilitates access to sites over a network.

A communication and synchronization module 412 may be stored in memory 404 and executed on the processing unit 402 to perform management functions in conjunction with the supervisory service 102.

The embodiment of the eBook reader device 104(1) described herein may also include a cryptography module 414. The cryptography module 414 provides various cryptographic functions, including the functions described above to generate random support codes and to generate new passcodes.

The reader device 104(1) in this embodiment also includes an authentication module 416. The authentication module 416 performs the device authentication procedures described with reference to FIGS. 1 and 2.

The eBook reader device 104(1) may further include the display 112 upon which electronic books are rendered. In one implementation, the display uses ePaper display technology, which is bi-stable, meaning that it is capable of holding text or other rendered images even when very little or no power is supplied to the display. Some illustrative ePaper-like displays that may be used with the implementations described herein include bi-stable LCDs, MEMS, cholesteric, pigmented electrophoretic, and others. In other implementations, or for other types of devices, the display may be embodied using other technologies, such as LCDs and OLEDs, and may further include a touch screen interface. In some implementations, a touch sensitive mechanism may be included with the display to form a touch-screen display.

The eBook reader device 104(1) may further be equipped with various input/output (I/O) components 418. Such components may include various user interface controls (e.g., buttons, joystick, keyboard, etc.), audio speaker, connection ports, and so forth, potentially including the character input interface 114 described with reference to FIG. 1.

A network interface 420 supports both wired and wireless connection to various networks, such as cellular networks, radio, WiFi networks, short range networks (e.g., Bluetooth), IR, and so forth. The network interface 420 facilitates receiving electronic books and other content as discussed herein.

The eBook reader device 104(1) also includes a battery and power control unit 422. The power control unit operatively controls an amount of power, or electrical energy, consumed by the eBook reader device. Actively controlling the amount of power consumed by the reader device may achieve more efficient use of electrical energy stored by the battery. In addition, the batter and power control unit 422 may facilitate putting the eBook reader device 104(1) into sleep or locked states after periods of inactivity or after a user has taken some action to turn off the device.

The eBook reader device 104(1) may have additional features or functionality 424. For example, the eBook reader device 104(1) may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
receiving, at a remote system and from a first electronic device associated with data representing a user account and a device identifier, a first code to request enabling access rights for a user through the first electronic device, wherein the device identifier was unassociated with the data representing a user account prior to receiving the first code;
generating, at the remote system and based at least in part on the device identifier having been previously unassociated with the data representing the user account, a second code utilizing a predetermined function;
identifying, at the remote system, one or more electronic devices associated with the user account;
selecting, from the one or more electronic devices associated with the user account, a second electronic device associated with the user account;
sending the second code from the remote system to the second electronic device;
receiving the second code at the remote system and from the first electronic device; and
enabling access rights for the first electronic device based at least in part on receiving the second code from the first electronic device, the access rights being enabled for the first electronic device and the second electronic device concurrently.

2. The method of claim 1, further comprising:
authenticating the first electronic device; and
wherein enabling the access rights for the first electronic device comprises enabling the access rights based at least in part on authenticating the first electronic device.

3. The method of claim 1, further comprising:
determining the second code is valid for a predetermined period of time; and
wherein receiving the second code from the first electronic device comprises receiving the second code during the predetermined period of time.

4. The method of claim 1, further comprising enabling the first code to access the user account associated with the first electronic device.

5. The method of claim 1, wherein the second code comprises a random number of a predetermined length.

6. The method of claim 1, further comprising sending, to the first electronic device, an indication that the second code is being sent to the second electronic device.

7. The method of claim 1, wherein generating the second code comprises generating the second code based at least in part on the device identifier of the first electronic device.

8. The method of claim 1, further comprising associating the first electronic device with the user account based at least in part on enabling the access rights for the first electronic device.

9. The method of claim 1, wherein enabling the access rights for the first electronic device comprises enabling the access rights based at least in part on receiving the second code within a predetermined amount of time from sending the second code to the second electronic device.

10. The method of claim 1, further comprising:
determining that an amount of time since the first electronic device was utilized in association with the user account satisfies a predefined period of inactivity; and
disabling use of the data representing the user account by the first electronic device based at least in part on the amount of time satisfying the predefined period of inactivity.

11. A system comprising:
one or more processors; and
non-transitory computer-readable media storing instructions that, when executed by the one or more processors, cause the one or more processors to perform operations comprising:
receiving, from a first electronic device associated with data representing a user account and a device identifier, a first code to request enabling access rights for a user through the first electronic device, wherein the device identifier was unassociated with the data representing a user account prior to receiving the first code;
generating, based at least in part on the device identifier having been previously unassociated with the data representing the user account, a second code utilizing a predetermined function;
identifying one or more electronic devices associated with the user account;
selecting, from the one or more electronic devices associated with the user account, a second electronic device associated with the user account;
sending the second code to the second electronic device;
receiving the second code from the first electronic device; and
enabling access rights for the first electronic device based at least in part on receiving the second code from the first electronic device, the access rights being enabled for the first electronic device and the second electronic device concurrently.

12. The system of claim 11, the operations further comprising:
authenticating the first electronic device; and
wherein enabling the access rights for the first electronic device comprises enabling the access rights based at least in part on authenticating the first electronic device.

13. The system of claim 11, the operations further comprising:
determining the second code is valid for a predetermined period of time; and
wherein receiving the second code from the first electronic device comprises receiving the second code during the predetermined period of time.

14. The system of claim 11, the operations further comprising enabling the first code to access the user account associated with the first electronic device.

15. The system of claim 11, wherein the second code comprises a random number of a predetermined length.

16. The system of claim 11, the operations further comprising sending, to the first electronic device, an indication that the second code is being sent to the second electronic device.

17. The system of claim 11, wherein generating the second code comprises generating the second code based at least in part on the device identifier of the first electronic device.

18. The system of claim 11, the operations further comprising associating the first electronic device with the user account based at least in part on enabling the access rights for the first electronic device.

19. The system of claim 11, wherein enabling the access rights for the first electronic device comprises enabling the access rights based at least in part on receiving the second code within a predetermined amount of time from sending the second code to the second electronic device.

20. The system of claim 11, the operations further comprising:

determining that an amount of time since the first electronic device was utilized in association with the user account satisfies a predefined period of inactivity; and disabling use of the data representing the user account by the first electronic device based at least in part on the amount of time satisfying the predefined period of inactivity.

* * * * *